Figure 1:
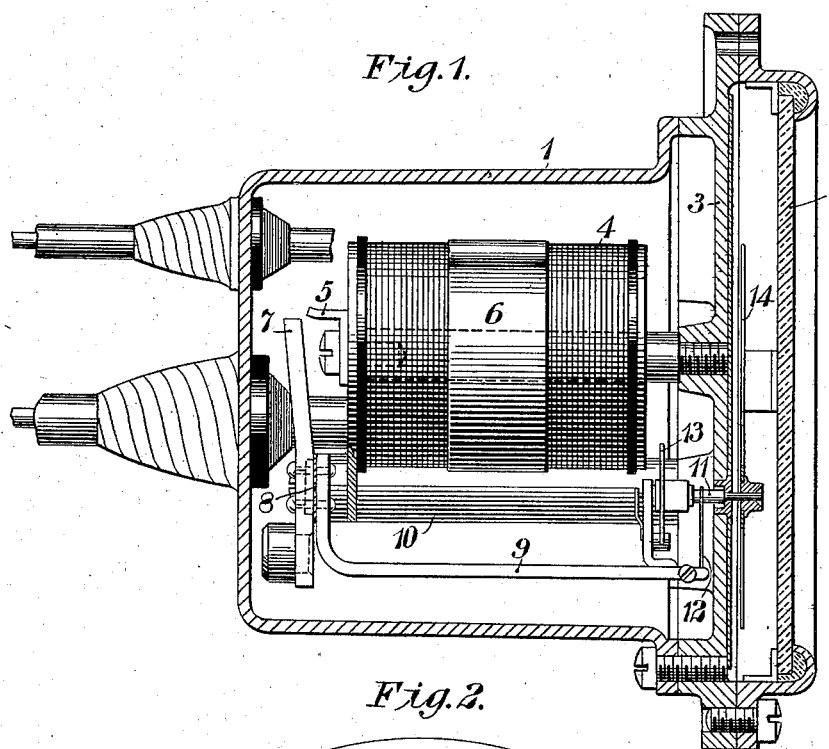

No. 731,484. PATENTED JUNE 23, 1903.
H. P. MAXIM.
CHARGE INDICATOR FOR SECONDARY BATTERIES.
APPLICATION FILED AUG. 4, 1902.

NO MODEL. 2 SHEETS—SHEET 1.

WITNESSES:
C. L. Belcher
Birney Hines

INVENTOR
Hiram Percy Maxim
BY
Wesley G. Carr
ATTORNEY.

No. 731,484. PATENTED JUNE 23, 1903.
H. P. MAXIM.
CHARGE INDICATOR FOR SECONDARY BATTERIES.
APPLICATION FILED AUG. 4, 1902.
NO MODEL.
2 SHEETS—SHEET 2.

WITNESSES:
C. L. Belcher
Birney Hines

INVENTOR
Hiram Percy Maxim
BY
Wesley S. Carr
ATTORNEY

No. 731,484. Patented June 23, 1903.

UNITED STATES PATENT OFFICE.

HIRAM PERCY MAXIM, OF PITTSBURG, PENNSYLVANIA, ASSIGNOR TO WESTINGHOUSE ELECTRIC & MANUFACTURING COMPANY, A CORPORATION OF PENNSYLVANIA.

CHARGE-INDICATOR FOR SECONDARY BATTERIES.

SPECIFICATION forming part of Letters Patent No. 731,484, dated June 23, 1903.

Application filed August 4, 1902. Serial No. 118,382. (No model.)

*To all whom it may concern:*

Be it known that I, HIRAM PERCY MAXIM, a citizen of the United States, residing in Pittsburg, in the county of Allegheny and State of Pennsylvania, have invented a new and useful Improvement in Charge-Indicators for Secondary Batteries, of which the following is a specification.

My invention relates to devices for indicating the condition of secondary batteries as regards their degree of charge; and it has for its object to provide a simple and efficient means for indicating the battery charge at all times irrespective of the size of the battery and its rate of discharge.

In the use of secondary batteries for operating automobile-motors it is important that the user have at his command some means which shall indicate the amount of available battery charge in order to facilitate economical service, avoid injury to the battery by drawing energy from it after the safety limit has been reached, and also in order to avoid possible discomfort and inconvenience by reason of undertaking to travel a distance for which the battery charge is inadequate.

The voltage of a battery the capacity and characteristics of which are known under normal load indicates with reasonable accuracy the amount of available charge; but the desired indication is afforded by an ordinary voltmeter only when the battery is discharging at a normal rate. It is therefore impossible to utilize such an instrument effectively except at intervals when the conditions of operation happen to be such as to afford a normal discharge rate.

In order to insure a substantially accurate indication of the available charge at all times whatever may be the discharge rate at which the battery is operating, I have devised a voltage-indicating instrument which is provided with means of compensation for such voltage variations as are incident to variations in the discharge rate—that is to say, I provide compensation both for the drop in voltage which pertains to discharge rates that are above the normal and for the rise in voltage which pertains to discharge rates that are below the normal, and thereby secure a voltage indication that corresponds to the normal discharge rate, and therefore shows the condition of the battery charge.

Figure 2:
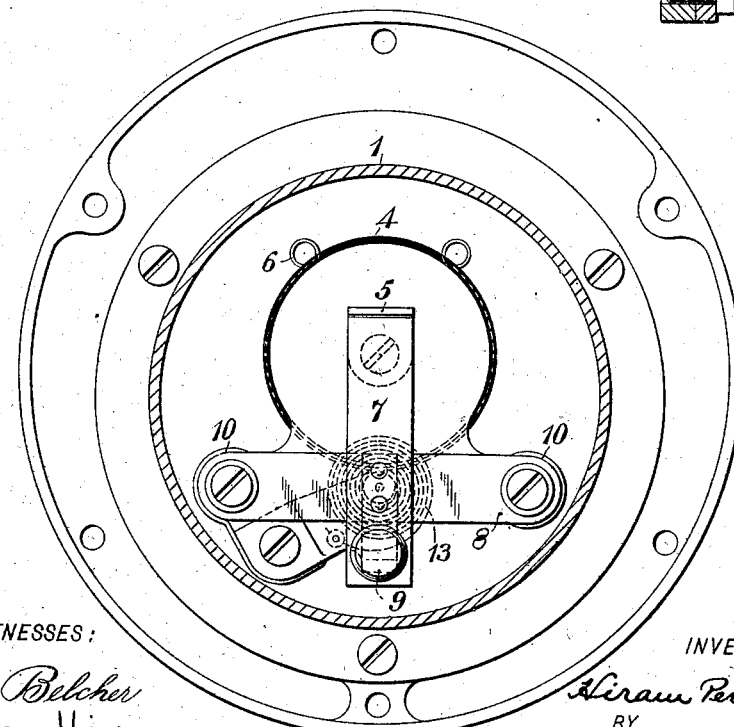
Figure 3:
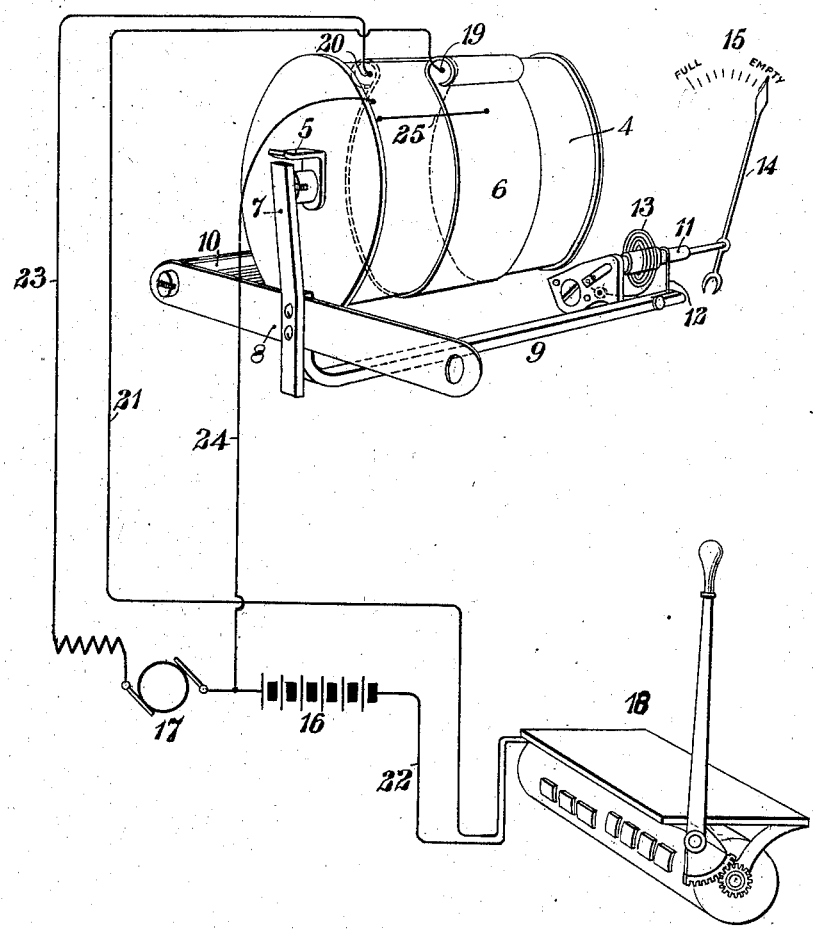

Referring to the accompanying drawings, in which my invention is illustrated, Figure 1 is a view, partially in side elevation and partially in section, of my battery-charge indicator. Fig. 2 is a view, partially in transverse section and partially in rear elevation, of the instrument shown in Fig. 1; and Fig. 3 is a perspective view, partially diagrammatic in character, of the indicator, a battery, a motor, and a controlling device.

The casing 1 of the instrument may be of any suitable form and dimensions, but is here shown as cylindrical and as provided with a circular glass plate 2 at its front end, behind which is a circular plate 3, from which the principal operating parts of the instrument are supported. A relatively high resistance-coil 4, which is shown as in the form of a spool, has a pole-piece 5 at its rear end and is nearly surrounded by a low-resistance coil 6 of strap metal, for which it constitutes a support. An armature 7 is supported by a thin metal strip 8, which is riveted between the armature and a longitudinally-projecting arm 9, and the strip 8 is, in turn, supported by two posts 10, which project rearwardly from the plate 3 of the framework.

The arm 9 is connected to a short shaft 11 by means of a cord or chain 12, and the shaft is journaled in suitable bearings supported by the frame of the instrument in such manner that when the free end of the arm 9 is moved downward by reason of the inward movement of the upper end of the armature 7 the shaft 11 will be turned against the action of a coil-spring 13, and thus move a pointer 14 along a scale 15. As the pull of the magnet decreases the reactional resilience of the strip 8 will raise the free end of the arm 9, and thus permit the spring 13 to turn the shaft in the opposite direction.

The apparatus in connection with which the above-described indicator will generally be used is indicated diagrammatically in Fig. 3 and comprises a battery 16, a motor 17, and a controller 18, the circuits and connections being as follows: The terminals 19 and 20 of the low-resistance coil 6 are respectively connected to one terminal of the battery through the controller by conductors 21 and 22 and to one terminal of the field-magnet of the motor 17 by a conductor 23. One terminal of the winding 4 is connected to the terminal of the battery adjacent to the motor by a conductor 24 and the other terminal is connected to the coil 6 by means of a conductor 25. It will be seen, therefore, that the coil 4 is connected across the battery-circuit to provide, in conjunction with the armature and the indicating means connected thereto, an indication of the battery-voltage at each instant of time during which the apparatus is in service and that the coil 6 is connected in series with the battery, whereby the relatively large currents which accompany heavy loads and corresponding low voltages and the relatively small currents which accompany light loads and corresponding high voltages will traverse it and correspondingly affect the magnetic pull upon the armature of the instrument. It follows that the variations in the voltage from that which indicates normal load and a normal discharge rate will be compensated for by the series coil of the instrument in such manner that the indicating device will be actuated directly to indicate at each instant the voltage which corresponds to the condition of the battery.

The precise construction and arrangement of parts shown are obviously not essential to my invention, and, in fact, it would be feasible to employ a permanent magnet as the principal member of the field portion of the instrument, the reinforcing coil or coils being applied thereto. Such a combination would be open to the objection, however, that the magnetization due to the flow of current from the battery to the auxiliary coil or coils would tend to change the adjustment of the instrument by reason of the fact that it would tend to permanently increase the magnetizing force or pull of the permanent magnet.

I claim as my invention—

1. The combination with a battery and a motor, of a charge-indicator having an armature and a magnet provided with an exciting-winding, at least a portion of which is in series with the battery.

2. The combination with a battery and a motor, of a charge-indicator having an armature, an indicator connected thereto and a magnet having a winding, at least a portion of which is in series with the battery.

3. The combination with a battery and a motor, of a charge-indicator having an armature and a magnet having a winding in series with the battery-circuit and a winding connected across said circuit.

4. A charge-indicator for batteries comprising a movable armature having an indicating device and a magnet having a winding at least a portion of which is connected in series with the battery.

5. A charge-indicator for batteries comprising a voltage-coil, a compensating coil and an armature acted upon by said coils jointly.

6. A charge-indicator for batteries comprising voltage-indicating means and a compensating coil in series with the battery which serves, in conjunction with said voltage-indicating means, to insure a correct indication of the charge.

7. In a charge-indicator for secondary batteries, the combination with a scale and pointer one of which is movable with reference to the other, of an armature which is connected to the movable indicating member, a voltage-coil and a compensating coil both of which act upon said armature to provide a reliable indication of the condition of the battery.

In testimony whereof I have hereunto subscribed my name this 31st day of July, 1902.

HIRAM PERCY MAXIM.

Witnesses:
JAMES B. YOUNG,
WESLEY G. CARR.